(12) United States Patent
Chatterjee et al.

(10) Patent No.: US 7,117,310 B2
(45) Date of Patent: Oct. 3, 2006

(54) SYSTEMS AND METHODS FOR CACHE SYNCHRONIZATION BETWEEN REDUNDANT STORAGE CONTROLLERS

(75) Inventors: Paresh Chatterjee, Fremont, CA (US); Chayan Biswas, Newark, CA (US); Ragendra Mishra, Fremont, CA (US); Senthil Thangaraj, Fremont, CA (US)

(73) Assignee: LSI Logic Corporation, Milpitas, CA (US)

( * ) Notice: Subject to any disclaimer, the term of this patent is extended or adjusted under 35 U.S.C. 154(b) by 347 days.

(21) Appl. No.: 10/780,971

(22) Filed: Feb. 18, 2004

(65) Prior Publication Data

US 2005/0182906 A1    Aug. 18, 2005

(51) Int. Cl.
*G06F 12/00*    (2006.01)
(52) U.S. Cl. .................... 711/141; 711/127; 711/143; 710/53
(58) Field of Classification Search ........ 711/127–129, 711/141–149, 170–173; 710/52–57; 714/6
See application file for complete search history.

(56) References Cited

U.S. PATENT DOCUMENTS

| | | | |
|---|---|---|---|
| 5,559,952 A * | 9/1996 | Fujimoto | 345/557 |
| 6,247,099 B1 * | 6/2001 | Skazinski et al. | 711/141 |
| 6,912,669 B1 * | 6/2005 | Hauck et al. | 714/6 |

* cited by examiner

*Primary Examiner*—Nasser Moazzami
(74) *Attorney, Agent, or Firm*—Duft, Bornsen & Fishman, LLP (57) ABSTRACT

Systems and methods for maintaining cache coherency between a first controller and a redundant peer controller while reducing communication overhead processing involved in the coherency message exchange. Header or meta-data information is accumulated in a buffer in a first controller along with updated cache data (if any) and forwarded to the peer controller. The accumulating information may be double buffered so that a buffer is filling as a previously filled buffer is transmitting to the peer controller. The peer controller processes the received information to update its mirror cache memory to maintain coherency with the first controller's cache memory with respect to dirty data. The method and systems avoid the need to update cache coherency in response to every flush operation performed within the first controller to thereby improve overall system performance.

16 Claims, 4 Drawing Sheets

SYSTEMS AND METHODS FOR CACHE SYNCHRONIZATION BETWEEN REDUNDANT STORAGE CONTROLLERS

BACKGROUND OF THE INVENTION

1. Field of the Invention

The present application relates to storage systems and in particular relates to improved methods and systems for maintaining cache coherency between multiple, redundant storage controllers.

2. Discussion of Related Art

Numerous computing and communication devices and applications utilize redundant controller technologies to help improve reliability of the subsystem. For example, in computer storage subsystems used for storing and retrieving data, it is common to utilize redundant storage controllers coupled to redundant storage devices such as disk drives to improve reliability of the storage subsystem. In addition, well known RAID storage management techniques may be applied to the data stored on disk drives to further enhance reliability and performance of the system.

Where redundant controllers are utilized, a pair of controllers may be configured such that a first controller is "active" processing requests from attached host devices and a second controller may be "passive" awaiting activation to take over responsibility for processing requests in response to sensing a failure of the first active controller. In addition, other configurations may be applied to make both controllers of a redundant pair active such that each controller is active processing distinct requests from attached host devices and each active controller is also operable to monitor performance of the opposing or peer controller of the redundant pair. Therefore, each controller is active and simultaneously ready to take over processing responsibilities of its peer controller of the redundant pair. Such a configuration may often be referred to as dual-active or active/active.

It is also generally known, particularly for storage controllers, to utilize cache memory structures to improve the overall performance of the controller device and thereby improve performance of the associated system or subsystem. For example, in storage controllers, it is common and that each active controller will maintain a cache memory such that write operations from an attached host device are processed by recording the supplied write data in the cache memory. At a later point in time, when the storage controller may be generally idle, information recorded in the cache memory may be posted or flushed to the disk drives for persistent storage. Such data recorded in cache memory but not yet posted or flushed to the disk drives as may be referred to as "dirty".

In an active/active redundant controller configuration, each active controller utilizes its own cache memory to record data associated with read and write operations performed by that controller. Since each active controller also serves to stand ready to take over operations of its peer controller in case of failure, the contents of each active controller's cache memory must be made known to the peer controller. It is generally known to allocate an additional, alternate cache memory within each active controller used to mirror the contents of the peer controller's active cache memory. Maintaining such mirrored status is often referred to as cache coherency such that the active cache in an active controller and the corresponding alternate cache in a peer controller are maintained as coherent. Failure to do so could result in inconsistencies in the data recorded on the persistent record of the disk drives. For example, if the active cache in an active controller flushes dirty data to the disk drives, but the corresponding mirror cache in the peer controller still has the dirty data in it's alternate cache, later updates to that location followed by a failure of the active controller may cause the peer controller to flush old, previously dirty data to the disk drive despite the updates performed by the active controller just prior to its failure.

It is generally known in the art that dual-active controllers must communicate with one another to exchange cache coherency information to thereby maintain coherency between each active controller's cache memory and the alternate cache memory in the corresponding peer controller. In general, prior techniques for maintaining such cache coherency have required that flush operations that may post significant volumes of dirty data from the active cache memory to the disk drives must be mirrored in the alternate cache of the peer controller. Therefore, previous cache coherency techniques and structures have generally relied on communicating cache coherency information corresponding to flushed cache data between the active controllers.

Such flush operations may generate significant volumes of data to be posted to the disk drives and hence a corresponding significant volume of data to be exchanged between the active controllers. Further, the frequency of such cache flush operations may further exacerbate the problem associated with such high volumes of data exchanged between active controllers.

It is therefore an ongoing challenge to improve the efficiency of communications between dual-active controller having mirrored cache memories to maintain cache coherency while reducing overhead processing and communication to thereby improve overall system performance.

SUMMARY OF THE INVENTION

The present invention solves the above and other problems, thereby advancing the state of the useful arts, by providing systems and methods for maintaining cache coherency by communicating cache coherency information between the dual-active controllers in conjunction with read and write request processing to thereby obviate the need for exchanging larger volumes of cache coherency information in conjunction with cache flush operations.

A first feature hereof therefore provides a method for maintaining cache coherency between a first controller and a peer controller, the method comprising: updating cache data in a write-back cache memory in the first controller in response to read or write requests from an attached host; buffering information regarding changes to the cache memory in the first controller that affect cache coherency of a mirrored cache memory in the peer controller; and transmitting the buffered information and associated cache data from the first controller to the peer controller to maintain cache coherency between the cache memory of the first controller and that mirrored cache memory of the peer controller, such that the buffered information serves to maintain cache coherency without requiring a step of informing the peer controller of any cache flush operation performed in the first controller.

Another aspect hereof further provides that the step of buffering further comprises: filling a first buffer while a second buffer is transmitting to the peer controller; sensing completion of transmission of the second buffer to the peer controller; and filling the second buffer while the first buffer is transmitting to the peer controller.

Another aspect hereof further provides that the step of transmitting further comprises: transmitting the first buffer when any information is stored in the first buffer and the second buffer is not transmitting; and transmitting the second buffer when any information is stored in the second buffer and the first buffer is not transmitting.

Another aspect hereof further provides that the step of transmitting further comprises: transmitting the buffered information and associated cache data using a single command structure.

Another aspect hereof further provides that the step of transmitting further comprises: transmitting a SCSI Write Buffer command for transmitting the buffered information and the associated cache data.

Another aspect hereof further provides that the step of buffering further comprises: generating a header information block indicative of a range of affected cache data corresponding to a read or write operation performed by the first controller; and adding the generated header information block to a filling buffer list of header information blocks.

Another aspect hereof further provides that the step of transmitting further comprises: determining whether an active buffer list previously filled with header information blocks and associated cache data is presently transmitting to the peer controller; and provides that, in response to determining that no active buffer list is presently transmitting, the following steps are performed: designating the filling buffer list as the active buffer list; initiating transfer of the active buffer list to the peer controller; and designating another buffer list as the filling buffer list.

Another aspect hereof further provides that the step of updating further comprises flushing cache data from the write-back cache memory in the first controller to thereby make room available in the write-back cache memory, and provides that the step of buffering information further comprises buffering information to invalidate cache data in the mirrored cache memory in the peer controller that corresponds to the dirty data flushed by the first controller if the step of updating is responsive to a read request from an attached host.

Another feature hereof provide a system comprising: a first storage controller having a cache memory; a second storage controller having a mirrored cache memory; and a communication channel coupling the first controller and the peer controller for exchanging cache coherency information. The first controller further comprises: a filling buffer list for accumulating header information regarding changes in the cache memory of the first controller; an active buffer list for transmitting previously accumulated header information regarding changes in the cache memory of the first controller from the first controller to the peer controller; and a first coherency element coupled to the filling buffer list and coupled to the active buffer list to generate header information regarding changes in the cache memory of the first controller resulting from performing read and write operations and to store the generated header information in the filling buffer and to transmit the active buffer to the peer controller. The second controller further comprises: a second coherency element for receiving the transmitted header information from the first coherency element to update the mirrored cache memory accordingly. The first controller forwards no cache data to the second controller in response to periodic cache flush operations performed by the first controller.

Another feature hereof provides a method for maintaining cache coherency between a cache memory in a first controller and a mirror cache memory in a peer controller, the method comprising the steps of: generating in the first controller update meta-data regarding dirty data in the cache memory of the first controller altered in response to write requests received from an attached host system; generating in the first controller invalidation meta-data regarding dirty data in the cache memory of the first controller flushed by the first controller in response to read or write requests received from an attached host system; periodically transmitting the generated meta-data and any corresponding dirty data from the first controller to the peer controller to permit the peer controller to update its mirrored cache memory in accordance with the received meta-data and any corresponding cache data.

Another aspect hereof further provides that the steps of generating each include generating meta-data into a currently filling buffer as a previously filled buffer is being transmitted and further provide that the step of periodically transmitting includes the step of swapping the currently filling buffer and previously filled buffer after completion of the transmission of the previously filled buffer.

DETAILED DESCRIPTION OF THE DRAWINGS

Figure 1:
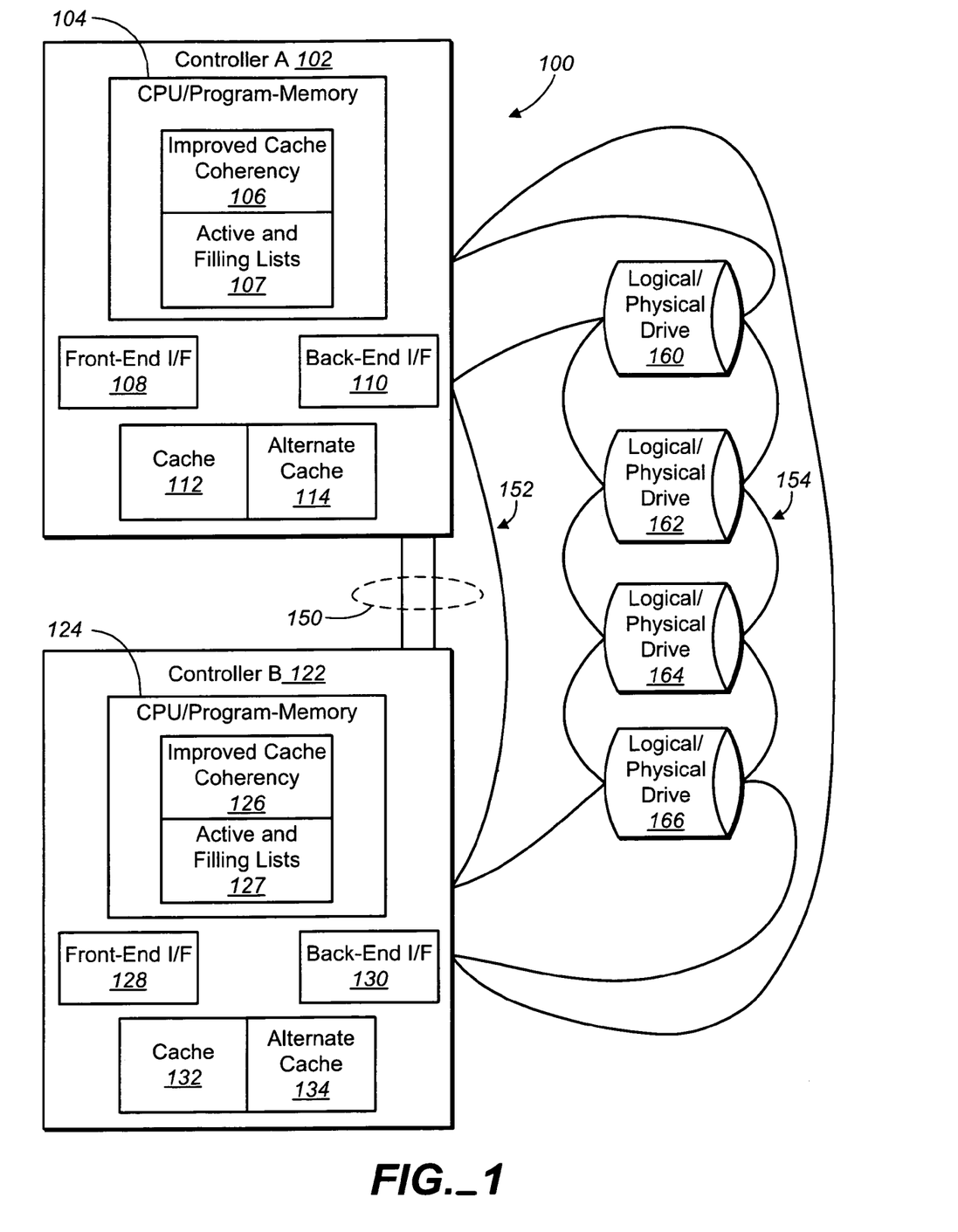
FIG. 1 is a block diagram of a system beneficially applying features and aspects hereof to improve efficiency of cache coherency exchanges between dual-active caching controller.

Figure one is a block diagram depicting a system 100 embodying features and aspects hereof. System 100 may be, for example, a storage subsystem having redundant controllers—namely controller A 102 and controller B 122. Each controller may preferably be substantially similar to its peer controller. As applied in such redundant storage systems such as RAID storage systems, each controller may be active and processing host supplied I/O read and write requests to store and retrieve data on logical drives 160 through 166. A storage controller receives write requests from a host device or host system to store supplied data on the disk drives of the storage subsystem or to retrieve data from the disk drives. In like manner, a storage controller may receive read requests from host devices or systems requesting the return of identified, previously stored data. As used herein, a host device or host system (or simply "host") may refer to any device coupled to the storage subsystem controllers (102 and 122) and adapted to direct requests thereto for the storage and retrieval of data. For example, a host may be a personal computer or workstation or an entire network of computers and workstations. In addition, host may refer to higher level storage network devices (i.e., storage area networks or SANs) such as storage network hubs, switches and routers as generally known in the art.

For purposes of communicating with such host devices, each controller (102 and 122) may include a front-end interface for coupling to communication media appropriate for exchange of information with the host or hosts. For example, controller A 102 may include front-end interface 108 and controller B 122 may include front-end interface 128. Those of ordinary skill in the art will recognize that any of numerous well known commercially available communication media, protocols and associated interface components may be employed for coupling system 100 to attached hosts. For example, SAN storage architectures may couple such a storage subsystem to storage network appliances via Fibre Channel or other serial communication media and protocol. When coupling directly to host computing systems or networks of host computing systems, front-end interface elements 108 and 128 may couple the respective controllers 102 and 122 to host systems via standard computer network communication media and protocols such as Ethernet or other local area networks (LANs).

As generally known in the art, logical drives 160 through 166 may represent any logical mapping of the physical storage capacity of one or more physical disk drives or other storage media. Such logical to physical mapping of storage space is often referred to in the storage arts as virtualization such that virtual storage locations may be dynamically mapped to any available physical storage devices and may be dynamically reorganized as appropriate to the particular storage application. Disk drives 160 through 166 may therefore represent any storage media managed by controllers 102 and 122—whether physical or virtualized, mapped, logical storage capacity.

In general, each redundant controller (102 and 122) may be coupled to the logical disk drives 160 through 166 via redundant communication paths 152 and 154. For example, controller A 102 may communicate with any of drives 160 through 166 via either loop communication path 154 or loop communication path 152. Communication paths 152 and 154 may be, for example, Fibre Channel loop communication structures or other communication media and protocol appropriate to the particular application. The redundancy, if any, for such communication paths between controllers and disk drives may vary widely in accordance with the needs of a particular application. Such redundancy considerations are well-known as a matter of design choice. In like manner, controller B 122 may also communicate with drives 160 through 166 via either loop communication path 152 or loop communication path 154. For purposes of such disk drive communication, each controller may include a back-end interface element (i.e., back-end interface 110 in controller A 102 and back-end interface 130 in controller B 122).

Each controller 102 and 122 may include a CPU with associated program memory 104 and 124, respectively. CPUs 104 and 124 may be any processor or control device capable of controlling operation of the various elements of the controllers. For example, a general or special purpose processor and/or IOP (I/O processor) may be utilized for the desired control functions. Any suitable processing device may therefore be utilized that has capabilities to provide the features and aspects hereof for improved cache coherency. Specifically, CPU 104 and 124 may be general purpose microprocessors or micro-controllers have integrated or associated program memory and direct memory access (DMA) features. The memory and DMA features may be integrated with the CPU 104 and 124 or may be separate components coupled to the processor.

Each controller (102 and 122) may include a local cache memory 112 and 132, respectively, for storing of data received from a host or read from the disks. In general, data provided the a controller by a host may be stored within the cache memory associated with controller processing the request. A "write back" cache memory architecture is generally operable to complete the host write request as soon as the data is successfully stored in local cache memory of the operating controller. The cached data may then be written to the persistent disk drive storage at a later time. Such later writing from the cache is often referred to as "flushing" the cache data or "posting" the cache data to disk. Similarly, data read from the disk drives 160 through 166 may also be stored in local cache memory. Data stored in such local cache memory may then be used to satisfy a subsequent read requests more rapidly. Data written to the cache may be posted or flushed to the disk drives 160 through 166 at a later time when the controller is more generally idle. More specifically, controller a 102 may write information in its local cache memory 112 in response to performing host read or write requests. Similarly, controller B 122 may write data into its local cache memory 132 in response to performing host read and write requests.

As generally known in the art and as discussed above, such redundant controllers may be operated in an active/passive manner or in an active/active manner. In an active/passive role, one of the two redundant storage controllers is operable to perform host read and write requests. The alternate or peer controller is generally in a standby or idle mode waiting to take over responsibility for processing host requests if and when a failure is detected in the operation of the first or active controller. Otherwise, the peer controller is idle and therefore is deemed passive. In an active/active configuration, both controllers (102 and 122) may be active processing requests from hosts attached to thereto. In addition to processing read and write requests from an attached host device, each controller stands ready to take over for operations of its peer controller. Since both controllers are active processing host supplied read and write requests, both controllers are deemed active controllers.

In an active/passive configuration, the active controller may, in general, duplicate the contents of its local cache memory in the cache memory of the passive controller. The duplication of such cache memory contents is required to maintain coherency between the active and passive cache memories so that if and when the passive controller takes over control following detection of a failure of the active controller, it's cache memory will be consistent with the last valid content of the active controller's cache memory prior to failure. Such coherency is critical to maintaining data integrity for information stored on the disk drives 160 through 166.

When both controllers are active processing I/O requests, the cache memory of each controller is preferably divided into an active or local cache memory portion and an alternate or mirrored cache memory portion. The active of local cache is used as described above in processing of host requests within that controller. The alternate or mirrored portion is used to substantially mirror the contents of the active cache in the peer's controller. For example, controller A 102 may include local cache memory 112 and alternate cache memory 114. Controller B 122 may include cache memory 132 and alternate cache memory 134. When controller A 102 is processing I/O requests, data is manipulated in its local cache memory 112 and substantially mirrored in the alternate cache memory 134 of controller B 122). When controller B 122 is processing I/O requests, data is manipulated within its cache memory 132 and substantially mirrored in alternate cache 114 of controller A 102. Controller A 102 and controller B 122 exchange cache coherency information to maintain coherency between the pairs of mirrored caches of the two controllers.

Cache coherency information may be exchanged between controller A 102 and controller B 122 via any available communication medium coupling the two controllers. In one aspect, the communication channels in use by each controller for communications with disk drives 160 through 166 may be utilized for exchanging cache coherency information. Specifically, communication channels 152 and 154 may be used as a redundant pair of communication channels for exchange of coherency information between controller A 102 and controller B 122. Alternatively, a dedicated communication path 150 may be provided between controller A 102 and controller B 122. Communication channel 150 maybe any of several well known communication media and protocols including, for example, Fibre Channel, other serial communication links, etc.

Features and aspects hereof improve the efficiency of maintaining cache coherency between redundant controllers by eliminating the need for communicating cache flush information between the two controllers. As noted above, a write back cache architecture requires that data written to cache memory in a controller may be posted or flushed to persistent storage on disks 160 through 166 at a later time. Each controller (102 and 122) may therefore periodically flush information stored in its local cache to record the data on disks 160 through 166. In so doing, prior cache coherency techniques generated and transmitted a substantial volume of cache coherency information between redundant controllers in response to the cache flush operation of each controller. By contrast, features and aspects hereof improve performance of the storage subsystem 100 by eliminating the need for updating cache coherency specifically in response to cache flush operations within the active controller. Rather, features and aspects hereof discussed further herein below maintain cache coherency by buffering information derived from cache updates generated by performing individual host read and write requests. In one aspect hereof, each controller maintains an active and filling buffer list for temporarily retaining header information regarding cache update operations performed in that controller. For example, controller A 102 includes active and filling buffer lists 107 while controller B 122 includes similar lists 127. As discussed further herein below, cache update information is recorded in the buffers and transmitted between the controllers substantially in conjunction with processing of corresponding read and write requests. By virtue of maintaining cache coherency in an efficient manner substantially in conjunction with processing of read and write request, features and aspects hereof obviate the need for generating and transmitting substantial volumes of cache coherency information in response to performing a periodic cache flush operation in each controller. Cache coherency information so generated and buffered in response to performing read and write requests may be communicated between the controllers via any available communication path as noted above including, for example, communication paths 150, 152 or 154.

Those of ordinary skill in the art will recognize a wide variety of equivalent architectures that may advantageously apply features and aspects hereof to improve performance of a storage subsystem 100 by reducing the volume and frequency of cache coherency information exchanged between redundant controllers. Further, those of ordinary skill in the art will recognize numerous additional components and configurations of controllers 102 and 122 as well as disks 160 and 166 and communication channels associated therewith. FIG. 1 is therefore merely intended as exemplary of all such redundant storage controller configurations that may advantageously apply features and aspects hereof to improve subsystem performance by reducing the volume and frequency of cache coherency information exchanged between the controllers.

Figure 2:
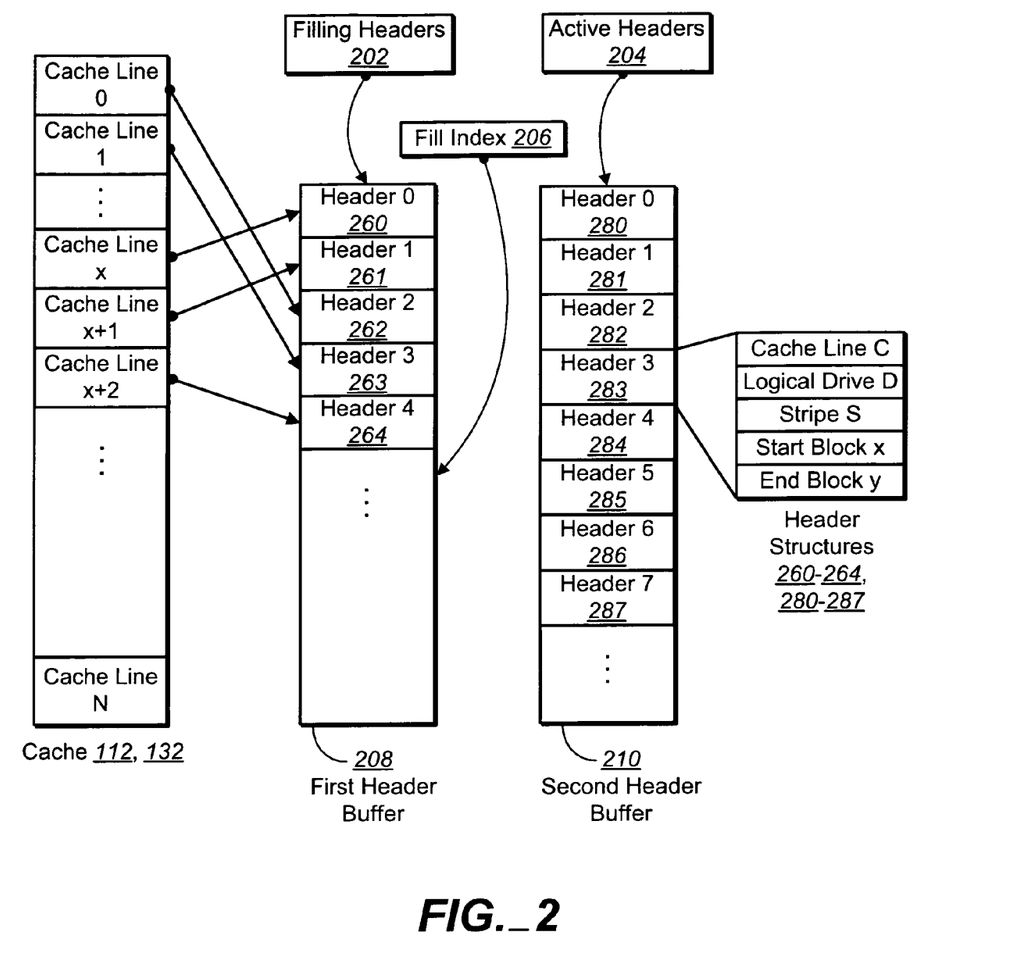
FIG. 2 is a block diagram of exemplary data structures useful in providing features and aspects hereof to maintain cache coherency.

FIG. 2 is a block diagram describing exemplary data structures useful in implementing features and aspects hereof to reduce overhead processing associated with maintaining cache coherency. Cache memory 112 and 132 may preferably be organized as a vector of cache lines indexed as cache line 0 through cache line N. Each cache line may be adapted to store one logical stripe of the logical drives associated with the storage subsystem. As generally known in the art, a stripe represents a portion of data stored in a logical drive that may comprise one or more portions of one or more physical disks of the storage subsystem. In general a stripe is preferably distributed over portions of multiple physical drives to allow for parallel, overlapped operation of multiple physical disk drives to process a single request. The particular striped layout and organization of the data may be defined as appropriate for the particular application to optimize for performance, redundancy, or both. Such storage management techniques including redundancy and striping techniques are well known to those of ordinary skill in the art as RAID storage management techniques. Each cache line 0 through N of cache memory 112 and 132 may therefore include one or more blocks of data associated with the corresponding stripe. In general, stripes all have a constant pre-determined number of blocks associated therewith. However, any number of blocks may be associated with a stripe.

As discussed above, a write back cache structure may preferably record data in a cache line in response to read or write operations performed by the controller. When data is written to cache memory in response to a host write operation, it may be posted or flushed at a later time to the persistent disk storage media. Until such time as the cached data is written (flushed or posted) to the persistent disk storage media, the data is deemed dirty—an indication that it needs to be posted or flushed to the disk storage media.

Each cache line 0 through N of cache memories 112 and 132 may comprise a number of blocks including data blocks and redundancy or parity information. Each cache line 0 through N may be associated with a bitmap data structure, i.e., a vector of bits—one for each block of the associated stripe. If a bit is set, the corresponding block of the associated stripe is considered dirty and ready for posting or flushing to the disk storage media. If a bit is reset, the corresponding block of the stripe is not dirty and need not be posted or flushed to disk storage media.

Figure 3:
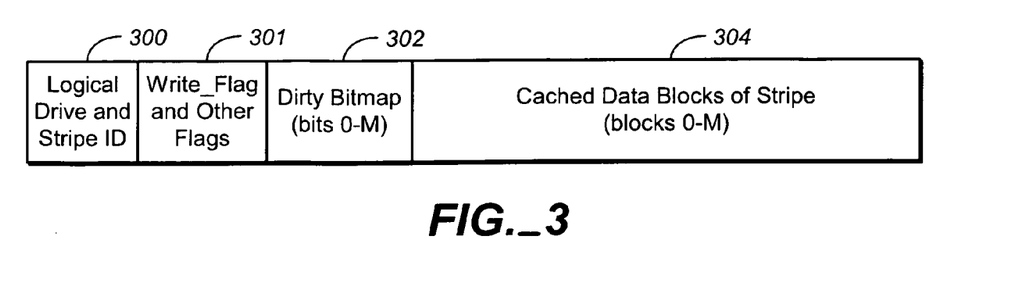
FIG. 3 is a block diagram of exemplary other data structures useful in providing features and aspects hereof to maintain cache coherency.

FIG. 3 is a block diagram describing an exemplary structure to represent each cache line. A first entry 300 in each cache line provides indicia of the logical drive and stripe (i.e., drive number and stripe number) with which the cache line is associated. Field 301 includes the Write_Flag (discussed further herein below) and any other flags useful in manipulating the and managing the cache line or the cache coherency processes. Field 302 is a bitmap structure as discussed above comprising a vector of bits indexed 0 through M each corresponding to one block of the associated stripe. Lastly, field 304 consists of the 0 through M blocks of the associated stripe.

Returning again to FIG. 2, each cache line 0 through N is associated with a corresponding exemplary header structure 260 through 264 when the cache line is first allocated or later modified. Each header structure includes a field indicating the cache line "C" with which it is associated, the logical drive "D" with which it is associated and the stripe number "S" with which it is associated. In addition, the blocks that have been written, if any, in the modified cache line are identified by a start block number "x" and an end block number "y". All contiguous blocks between x and y were modified by a write operation that generated the associated header structure. It will be noted that such a header structure is generated only when the cache line is first created and/or modified—each exemplary events which require coherency information to be exchanged with the peer controller.

The fields described above as elements of a header structure are intended merely as exemplary of one possible structure for storing such information. More generally, the header structure may include any meta-data that identifies changes to be made in particular cache lines in the mirror cache memory of the peer controller. Update meta-data may include information to permit the peer controller to update the mirror cache memory to reflect dirty data added to the first controller's cache memory. The update meta-data may therefore include the actual data blocks to be added to the mirror cache memory of the peer controller. Invalidation meta-data may simply identify cache lines of the cache memory of the first controller that have been flushed of dirty data by the first controller. Invalidation meta-data need not include any data blocks since the identified cache lines may simply be marked as invalid or available in the mirror cache memory. In effect, the mirror cache memory may be maintained in a coherent state with respect to any dirty data in the cache memory of the first controller. Non-dirty data in the first controller's cache memory need not be mirrored in the peer controller.

The generated meta-data is then accumulated as described herein and eventually transmitted to the peer controller. The meta-data received at the peer controller contains sufficient information to permit the peer controller to update its mirror cache memory to correspond to the first controller's cache memory as regards any dirty data stored in cache memory and not yet posted or flushed to disk storage.

Such header structures generated by operation of read and write requests within the controller are accumulated in a first header buffer 208. A filling headers pointer 202 may indirectly reference the start of the first buffer header in the list of header structures 0 through 4 (260 through 264) presently populating portions of the first header buffer 208. A fill index value 206 may indicate the next available location in first header buffer 208 in which a next header structure may be generated in response to processing of another read or write operation from an attached host.

A second header buffer 210 similarly includes header structures previously generated in conjunction with operation of host generated read and write requests. An active headers pointer 204 points to the start of second header buffer 210. As shown in FIG. 2 second header buffer 210 includes header structures 0 through 7 (280 through 287).

Methods associated with features and aspects hereof and discussed further herein below manipulate the data structures depicted in FIG. 2 to generate cache coherency information in the form of such header structures (260 through 264 and 280 through 287) and to transmit the generated header information along with associated cache data to the associated peer controller. Methods discussed further herein below generally utilize double-buffering or "ping-pong" buffering such that a first header buffer 208 may be filled with new header entries as a second header buffer 210, previously filled with header entries, is transmitted to the peer controller. The buffer to be filled (e.g., first header buffer 208) is pointed to by the filling headers pointer element 202 while the previously filled buffer (second header buffer 210) is pointed to by the active headers pointer element 204. Upon completion of the transmission of second header buffer 210 (and any associated cache data) to the peer controller, the active controller swaps the two pointers (202 and 204) and resets the fill index value 206 to permit filling of the second header buffer 210 while the first had a buffer 208 is transmitted to the peer controller.

Those of ordinary skill in the art will recognize that the data structures of FIG. 2 are merely representative of one exemplary collection of data structures that may be employed to provide features and aspects hereof for improved efficiency in maintaining cache coherency between dual active controllers. Numerous other similar data structures will be recognized by those of ordinary skill in the art to provide requisite information for monitoring cache coherency and maintaining cache coherency between dual active storage controllers.

The exemplary data structures described above with respect to FIG. 2 are useful in conjunction with methods described herein below with respect to FIGS. 4 through 7.

Figure 4:
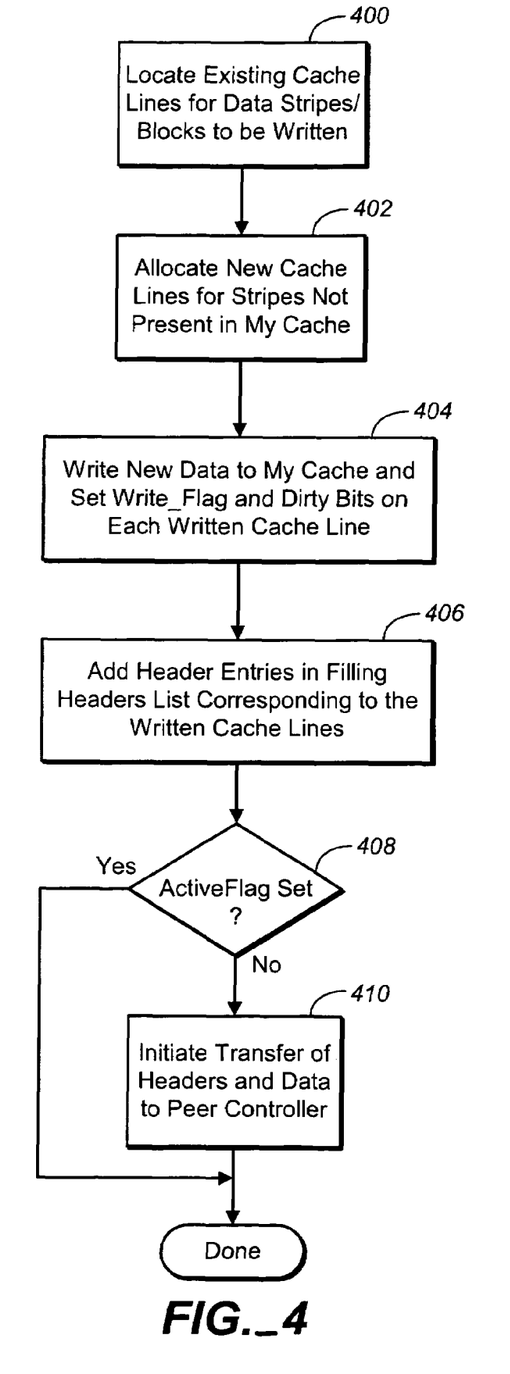
FIG. 4 is a flowchart describing features and aspects hereof to generate cache coherency information in conjunction with write request processing.

FIG. 4 is a flowchart describing features and aspects hereof operable to process a write request from an attached host in a manner that efficiently maintains cache coherency between dual active peer controllers without requiring exchange of data between the controllers responsive to a flush operation. Those of ordinary skill in the art will recognize that the method of FIG. 4 addresses only aspects relevant to the cache coherency features and aspects hereof. Normal storage controller operations to write data and to flush data from cache to the logical drives is removed from the flowchart for simplicity of explanation but is well understood by those of ordinary skill in the art. Further, those skilled in the art will recognize that the method of FIG. 4 is operable in an active controller processing write requests. In a dual-active configuration, each active controller may perform this same method to provide efficient cache coherency management between the controllers.

Element 400 is first operable in response to receipt of a write request from an attached host to locate cache lines in the controller's cache memory already corresponding to the stripes affected by the host generated write request. A new host write request may affect data already resident in the controllers cache memory and/or may affect data not yet present in the controller's cache memory. Element 402 is then operable to allocate new cache lines in cache memory for portions of affected data not presently in the controller's cache memory. As generally known in the art, allocating new cache lines for a new write request may entail removing previously cached data from the cache memory of the controller. As known in the art, if the cache data to be removed is dirty data, the data must be first flushed or posted to the persistent storage of the logical drive. Element 402 therefore represents all processing required to allocate new cache lines for the newly received request including any required flushing of dirty data from the cache memory. If flushing of dirty data is required, features and aspects hereof obviate the need for any cache coherency updates to be transmitted simply by virtue of the flush operation (if any)

performed as a part of element 402. Hence, features and aspects hereof improve efficiency of cache coherency communication between dual active peer controllers.

Having so located or allocated any cache lines required for the new write operation, element 404 is operable to write the host supplied data into the cache lines associated with the new request. The Write_Flag in each cache line so written is set by element 404 to indicate that the cache line was generated by a write operation rather than a read operation. The dirty bit for each affected block of each affected stripe is also set by element 404 to indicate that the newly written data is dirty and hence must be flushed or posted at some later time to the persistent storage of the disk drive. Element 406 is then operable to generate and add header entries to the presently filling buffer of header entries. As noted above, a pointer variable may point to a next available position in the presently filling buffer for header entries. Such an index variable may be incremented for each newly added header thereby indicating an offset to the next available buffer location for a generation and addition of a new header structure.

Element 408 then determines whether the ActiveFlag is presently set. The ActiveFlag may be associated with methods and structures hereof to indicate that a previously filled header buffer is presently transmitting to the peer controller to maintain cache coherency. If the ActiveFlag indicates that a previously filled buffer is presently transmitting to the peer controller, the method completes. If element 408 determines that the ActiveFlag is not presently set, indicating that there is no header buffer presently transmitting to the peer controller, element 410 is then operable to initiate the transfer of the header structures in the presently filling header buffer along with associated cache data.

Figure 5:
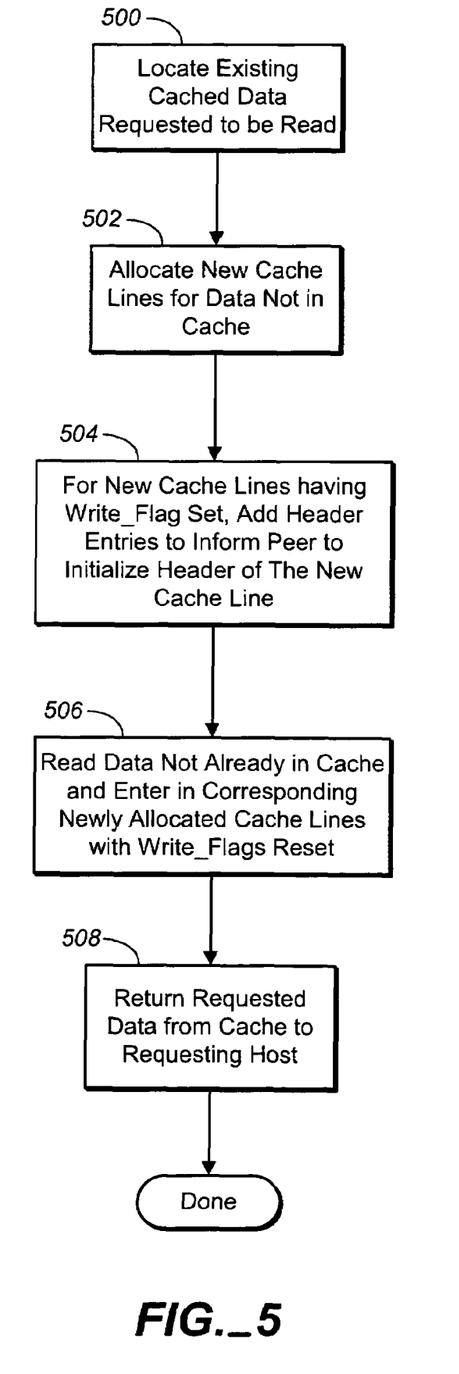
FIG. 5 is a flowchart describing features and aspects hereof to generate cache coherency information in conjunction with read request processing.

FIG. 5 is a flowchart describing an exemplary method implementing features and aspects hereof to process a host supplied read request. As noted above, read operations may generally be completed by returning requested data directly from cache memory when requested data is located in the cache. If the requested data is not presently located in the cache memory, the storage controller performs appropriate operations to read the requested information from the logical drives and store the returned requested data, now residing in cache memory, to the requesting host. In particular, element 500 is first operable to locate any portions of the requested data in the existing cache data presently residing in the controller's cache memory. Some or all of the requested data may be already resident within the cache memory. For any requested data not so located within the cache memory, element 502 is operable to allocate new cache lines for data not presently located in the cache memory. As above with respect to element 402 a FIG. 4, the allocation of new cache lines by processing of element 502 may require flushing of cache lines having dirty data to thereby free the cache line for reuse in this read operation. Though dirty data presently residing in the cache memory may be flushed by operation of the element 502, as noted above, a flush operation need not generate or exchange any cache coherency information between the two controllers. Rather, in accordance with features and aspects hereof to improve efficiency in maintaining cache coherency, header information is generated and exchanged in response to performing read and write operations thus obviating the need for exchanging cache coherency information in response to flush operations.

Element 504 is operable for each newly allocated cache line to inspect the Write_Flag in each newly allocated cache line and generate appropriate headers if needed. For each newly allocated cache line, if the Write_Flag is set in the newly allocated cache line, then generate a header and add it to the presently filling header buffer requesting that the peer controller initialize its corresponding mirrored cache line. Since the Write_Flag in a cache line structure indicates that the previous content of the cache line was generated by a write request and the new use of the cache line is for a read request, no cache data need be sent to the peer controller. Instead, the generated header merely instructs the peer controller to initialize the mirrored cache line. If not initialized in the peer controller, then upon take over by the peer controller in response to sensing failure of the active controller, the data in this mirrored cache line from an earlier write that has been flushed by the active controller could be again flushed by the peer controller and hence cause data corruption. A more detailed discussion of the use of the Write_Flag to overcome this issue is presented below.

Element 506 is then operable to retrieve any requested data from the appropriate logical drives not presently residing in the cache memory of the active controller. Element 508 then returns the requested data from cache memory to the requesting host.

Those of ordinary skill in the art will readily recognize a variety of equivalent method steps operable to provide features and benefits hereof to improve efficiency in maintaining cache coherency between redundant, dual active peer controllers. Further, those of ordinary skill in the art will recognize a variety of data structures that may be utilized in conjunction with the methods of FIGS. 4 and 5 for maintaining cache coherency between redundant, dual active, storage controllers. In particular, numerous equivalent methods will be readily apparent to those of ordinary skill in the art to provide efficient cache coherency control in conjunction with processing of host generated read and write requests while avoiding the need for updating cache coherency in conjunction with cache flush operations by an active controller.

The Write_Flag discussed above is useful to avoid data corruption in conjunction with features and benefits hereof. While prior techniques avoided this particular issue by updating a peer controller's alternate cache memory in response to flush operations, features and aspects hereof specifically obviate this requirement of prior techniques. Rather, cache coherency is maintained by exchange of coherency information in conjunction with processing of each host supplied read and write operation. The Write_Flag is important in this function as described above in FIGS. 4 and 5.

Consider the following situation where, as here, flush operations do not impose the burden of cache coherency updates but there is no logic as explained above using a Write_Flag (or an equivalent thereto):

Assume the following:

| | |
|---|---|
| C1 | Cache line 1 (a cache line in an active controller) |
| C2 | Cache line 2 (another cache line in an active controller) |
| MC1 | Mirror cache line 1 (the peer controller's mirror of C1) |
| MC2 | Mirror cache line 2 (the peer controller's mirror of C2) |
| LBA1 | Address of physical location on disk. | and consider the following conditions and sequence of events in the active and peer controllers:

1. If C1 holds dirty data to be flushed on LBA1, MC1 also holds the same data.

2. When C1 gets flushed to LBA1 by the active controller, MC1 is not invalidated and MC1 still holds dirty data. (So long as another cache line is not updated with newer data for LBA1, flushing of MC1 doesn't corrupt any data).

3. Now assume that C1 is used for a read operation. (If the read operation caused a flush, the peer will not be informed of the need to update its alternate cache).

4. Now assume that another cache line C2 (other than C1) is allocated for another write operation that affects LBA1. Now the peer's (mirror) cache has to be updated and MC2 is updated with the data in C2.

5. This gives rise to a situation where the peer controller's mirror cache has data for LBA1 both at MC1 and MC2, clearly and error. This would lead to data corruption.

To avoid this data corruption situation (without updating cache coherency on every cache flush), the Write_Flag is used to make sure that the peer's mirror cache doesn't have two dirty cache lines for the same LBA. Write_Flag is set (as above in FIG. 4) if a cache line is used for write operation and reset if the cache line is used for a read (as above in FIG. 5). If a cache line is used for read operation after it was previously used for a write operation (as indicated by the Write_Flag), then Write_Flag is reset and the cache line in the mirrored cache memory of the peer controller is invalidated by an appropriate header structure added to the header buffer and transmitted to the peer controller.

Those of ordinary skill in the art will recognize equivalent structures and methods to assure that the above situation will not occur and cause data corruption. The Write_Flag is therefore intended as an exemplary implementation of such a safeguard in conjunction with features and aspects hereof and is, at present, the best known mode of preventing such corruption.

Figure 6:
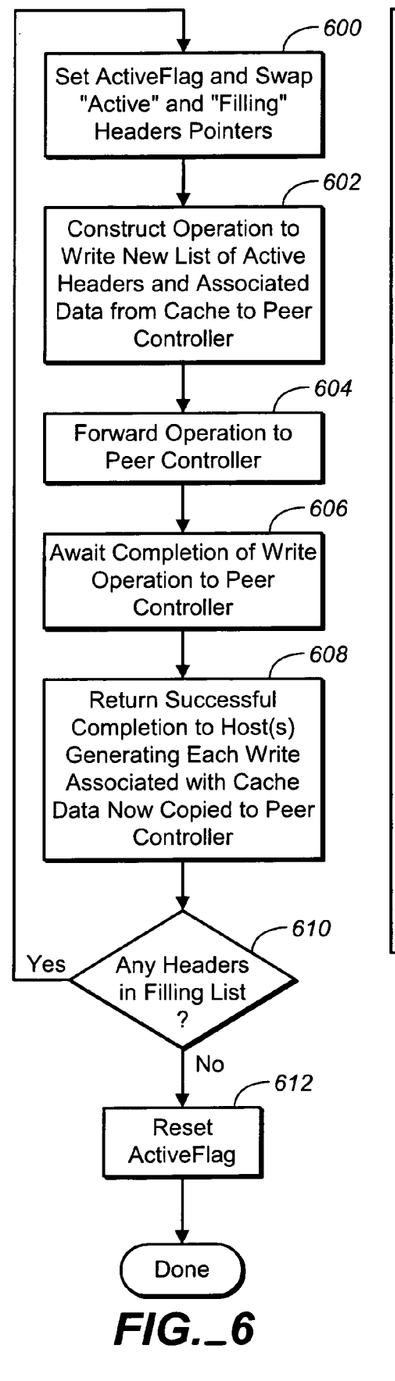
FIG. 6 is a flowchart describing features and aspects hereof to transmit cache coherency information from the active controller to its peer controller.
Figure 7:
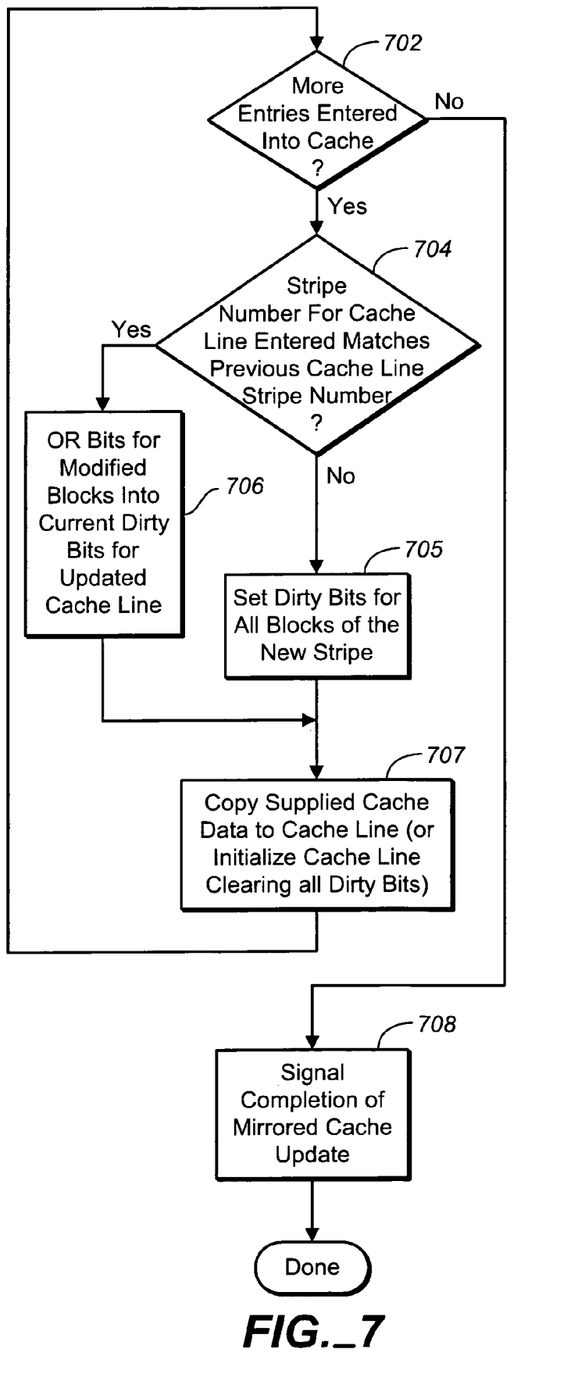
FIG. 7 is a flowchart describing features and aspects hereof to receive cache coherency information transmitted from the active controller.

FIGS. 6 and 7 are flowcharts describing methods operable in accordance with features and aspects hereof to exchange accumulated cache coherency information generated in conjunction with performing read and write operations in an active controller. In particular, FIG. 6 describes processing in an active controller for transmitting accumulated header structure information regarding the active controller's cache updates. FIG. 7 describes corresponding processing operable within the peer controller to receive the accumulated header information and associated cache data and to update its alternate or mirrored cache accordingly to thereby maintain cache coherency with the corresponding active controller.

Referring first to FIG. 6, the method is initiated when header structures are first generated and stored in a filling buffer list of such headers and when the ActiveFlag variable indicates that no previously filled buffer list of header structures is presently transmitting to the peer controller. Element 600 is therefore operable to set the ActiveFlag indicating processing presently underway to transmit a previously filled buffer of header information and associated cache data from the active controller to the peer controller. Element 600 is further operable to swap the designation of the "active" and "filling" header buffers. As noted above with respect to FIG. 2, such structures may be implemented as two distinct buffer lists and two associated pointers—one an active list pointer and a second filling list pointer. Element 600 may therefore swap as required the filling and active pointer variables to thereby commence filling of a second header structure buffer while the first, previously filled header structure buffer begins transmission to the peer controller.

Element 602 is then operable to construct an operation intended to transfer the header structures accumulated in the recently filled header buffer list (now the active buffer list) and the associated cache data to the peer controller for further processing therein. In one exemplary aspect hereof, a SCSI Write Buffer command may be used to write the accumulated header structures and the associated cache data in a single SCSI command transaction. Element 604 is then operable to forward the operation constructed by element 602 to the peer controller as, for example, a SCSI Write Buffer command. Further, as noted above, the command transfer and associated header and cache data may be exchanged over a communication channel dedicated to such communications between the two dual active controllers or may be transferred over existing channels used to couple the controllers to the logical drives.

Element 606 is then operable to await completion of the write operation used to transfer header and cache data to the peer controller. Upon completion of the transfer of such cache coherency information, element 608 is operable to return successful completion information to call all host systems but the responsible for generating write requests responsible for generating the cache update information. As noted in the write request processing of FIG. 4, the write request is not completed until the affected cache data is properly mirrored in the peer controller. Well known techniques may store a handle or ID to be associated with each request received from a host system. The handle or ID may be associated with corresponding headers (and associated cache data) transmitted to the peer controller. Regardless of whether the write buffer sequence to the peer controller is successful, the write request for the requesting host system may be completed. Other known techniques may then exchange information between the controllers to determine the cause of the failure in the exchange therebetween. Appropriate controls may then cause a take over by one of the controllers in response to the communication failure between the peer controllers.

Element 610 then determines whether any header information has been added to the newly designated filling buffer list during operation of elements 600 through 608. If so, processing continues by looping back to element 600 to again swap buffers and transfer the recently filled header list and associated cache data to the peer controller. When element 610 determines that no new header information has yet been generated, element 612 is operable to reset the ActiveFlag. The process of FIG. 6 may then be restarted when a new header structure is constructed and added to the presently filling buffer list to thereby initiate transmission of the headers to the peer controller.

FIG. 7 is a flowchart describing operations within the peer controller to receive the transmitted header and associated cache data from the active controller. Generation and transmission of the command to forward the header and cache data information may be as described above with respect to FIG. 6. FIG. 7 therefore represents corresponding processing within the peer controller receiving the SCSI Write Buffer command from the active controller.

Elements 702 through 707 are iteratively operable to process each header received and the corresponding cache data (if any). Element 702 is first operable to determine whether additional header entries remain to be processed for the received coherency information (headers and associated cache data). If not, the method completes with element 708 returning a signal to the active controller indicating completion of the cache coherency update. If additional header entries remain to be processed, element 704 is operable to determine whether the stripe number of a cache line to be updated in a next header entry to be processed matches the stripe number entered in the mirrored cache line. If so, element 705 sets the dirty bits for all blocks of the stripe.

Otherwise, element 706 performs a bitwise logical OR operation to logically OR in the dirty bits for the blocks affected by this updated cache line. In both cases, element 707 copies the updated cache data (if any) from the received transmission to the appropriate portions of the mirrored cache line to be updated. As noted, where use of the Write_Flag indicates that a previously written cache line has been re-used for read data, the header for that cache line may simply request invalidation or initialization of the corresponding cache line in the peer controller. In such a case, no cache data is forwarded with the initialization request and the dirty bits of the initialized cache line will all be cleared or reset. The method then continues looping back to element 702 to process additional headers.

Those skilled in the art will recognize that the data movement operation of element 707 to copy updated cache data to the updated cache line and the other processing of FIG. 7 may be overlapped by suitable multi-processor controller architectures. For example, an I/O processor (IOP) or DMA component of the controller may be active moving data as in element 707 while a general purpose processor (CPU) may be active processing information in the received headers as in elements 704–706.

Further, those of ordinary skill in the art will recognize a variety of equivalent methods to provide for transmission, reception and processing of cache coherency information in conjunction with performing read and write operations on behalf of a host system. The methods of FIGS. 6 and 7 are therefore intended merely as exemplary implementations of features and aspects hereof.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. In particular, those of ordinary skill in the art will readily recognize that features and aspects hereof may be implemented equivalently in electronic circuits or as suitably programmed instructions of a general or special purpose processor. Such equivalency of circuit and programming designs is well known to those skilled in the art as a matter of design choice. As a result, the invention is not limited to the specific examples and illustrations discussed above, but only by the following claims and their equivalents.

What is claimed is:

1. A method for maintaining cache coherency between a first controller and a peer controller, the method comprising:
   updating cache data in a write-back cache memory in the first controller in response to read or write requests from an attached host;
   buffering information regarding changes to the cache memory in the first controller that affect cache coherency of a mirrored cache memory in the peer controller; and
   transmitting the buffered information and associated cache data from the first controller to the peer controller to maintain cache coherency between the cache memory of the first controller and that mirrored cache memory of the peer controller,
   wherein the buffered information saves to maintain cache coherency without requiring a step of informing the peer controller of any cache flush operation performed in the first controller, and
   wherein the step of buffering further comprises:
   filling a first buffer while a second buffer is transmitting to the peer controller;
   sensing completion of transmission of the second buffer to the peer controller; and
   filling the second buffer while the first buffer is transmitting to the peer controller.

2. The method of claim 1
   wherein the step of transmitting further comprises:
   transmitting the first buffer when any information is stored in the first buffer and the second buffer is not transmitting; and
   transmitting the second buffer when any information is stored in the second buffer and the first buffer is not transmitting.

3. The method of claim 1
   wherein the step of transmitting further comprises:
   transmitting the buffered information and associated cache data using a single command structure.

4. The method of claim 3 wherein the step of transmitting further comprises:
   transmitting a SCSI Write Buffer command for transmitting the buffered information and the associated cache data.

5. The method of claim 1 wherein the step of buffering further comprises:
   generating a header information block indicative of a range of affected cache data corresponding to a read or write operation performed by the first controller; and
   adding the generated header information block to a filling buffer list of header information blocks.

6. The method of claim 5
   wherein the step of transmitting further comprises:
   determining whether an active buffer list previously filled with header information blocks and associated cache data is presently transmitting to the peer controller;
   in response to determining that no active buffer list is presently transmitting, performing the steps of:
   designating the filling buffer list as the active buffer list;
   initiating transfer of the active buffer list to the peer controller; and
   designating another buffer list as the filling buffer list.

7. The method of claim 1
   wherein the step of updating further comprises flushing cache data from the write-back cache memory in the first controller to thereby make room available in the write-back cache memory, and
   wherein the step of buffering information further comprises buffering information to invalidate cache data in the mirrored cache memory in the peer controller that corresponds to the dirty data flushed by the first controller if the step of updating is responsive to a read request from an attached host.

8. A system comprising:
   a first storage controller having a cache memory;
   a second storage controller having a mirrored cache memory; and
   a communication channel coupling the first controller and the peer controller for exchanging cache coherency information,
   wherein the first controller further comprises:
   a filling buffer list for accumulating header information regarding changes in the cache memory of the first controller;
   an active buffer list for transmitting previously accumulated header information regarding changes in the cache memory of the first controller from the first controller to the peer controller; and a first coherency element coupled to the filling buffer list and coupled to the active buffer list to generate header information regarding changes in the cache memory of the first controller resulting from performing read and write operations and to store the generated header information in the filling buffer and to transmit the active buffer to the peer controller, wherein the second controller further comprises:

a second coherency element for receiving the transmitted header information from the first coherency element to update the mirrored cache memory accordingly, and wherein the first controller forwards no cache data to the second controller in response to periodic cache flush operations performed by the first controller.

9. A method for maintaining cache coherency between a cache memory in a first controller and a mirror cache memory in a peer controller, the method comprising the steps of:

generating in the first controller update meta-data regarding dirty data in the cache memory of the first controller altered in response to write requests received from an attached host system;

generating in the first controller invalidation meta-data regarding dirty data in the cache memory of the first controller flushed by the first controller in response to read or write requests received from an attached host system;

periodically transmitting the generated meta-data and any corresponding dirty data from the first controller to the peer controller to permit the peer controller to update its mirrored cache memory in accordance with the received meta-data and any corresponding cache data, wherein the steps of generating each include generating meta-data into a currently filling buffer as a previously filled buffer is being transmitted and wherein the step of periodically transmitting includes the step of swapping the currently filling buffer and previously filled buffer after completion of the transmission of the previously filled buffer.

10. A system for maintaining cache coherency between a first controller and a peer controller, the system comprising:

updating means for updating cache data in a write-back cache memory in the first controller in response to read or write requests from an attached host;

buffering means for buffering information regarding changes to the cache memory m the first controller that affect cache coherency of a mirrored cache memory in the peer controller; and transmitting means for transmitting the buffered information and associated cache data from the first controller to the peer controller to maintain cache coherency between the cache memory of the first controller and that mirrored cache memory of the peer controller, wherein the buffered information serves to maintain cache coherency without requiring a step of informing the peer controller of any cache flush operation performed in the first controller, and wherein the buffering means further comprises:

means for filling a first buffer while a second buffer is transmitting to the peer controller;

means for sensing completion of transmission of the second buffer to the peer controller; and means for filling the second buffer while the first buffer is transmitting to the peer controller.

11. The system of claim 10 wherein the transmitting means further comprises:

means for transmitting the first buffer when any information is stored in the first buffer and the second buffer is not transmitting; and means for transmitting the second buffer when any information is stored in the second buffer and the first buffer is not transmitting.

12. The system of claim 10 wherein the transmitting means further comprises:

means for transmitting the buffered information and associated cache data using a single command structure.

13. The system of claim 12 wherein the means for transmitting further comprises:

means for transmitting a SCSI Write Buffer command for transmitting the buffered information and the associated cache data.

14. The system of claim 10 wherein the buffering means further comprises:

means for generating a header information block indicative of a range of affected cache data corresponding to a read or write operation performed by the first controller; and means for adding the generated header information block to a filling buffer list of header information blocks.

15. The system of claim 14 wherein the transmitting means further comprises:

means for determining whether an active buffer list previously filled wit header information blocks and associated cache data is presently transmitting to the peer controller;

means for determining that no active buffer list is presently transmitting;

means responsive to the means for determining for designating the filling buffer list as the active buffer list;

means responsive to the means for determining for initiating transfer of the active buffer list to the peer controller; and means responsive to the means for determining for designating another buffer list as the filling buffer list.

16. The system of claim 10 wherein the updating means further comprises means for flushing cache data from the write-back cache memory in the first controller to tbereby make room available in the write-back cache memory, and wherein the buffering means further comprises means for buffering information to invalidate cache data in the minored cache memory in the peer controller that corresponds to the dirty data flushed by the first controller if the updating means is operating in response to a read request from an attached host.

* * * * *